United States Patent

Hester, Jr.

[11] 3,896,109
[45] July 22, 1975

[54] 2,3-DEHYDRO-1H-1,4-BENZODIAZEPINES

[75] Inventor: Jackson B. Hester, Jr., Galesburg, Mich.

[73] Assignee: The Upjohn Company, Kalamazoo, Mich.

[22] Filed: Jan. 7, 1974

[21] Appl. No.: 431,111

Related U.S. Application Data

[63] Continuation-in-part of Ser. No. 185,381, Sept. 30, 1971, abandoned.

[52] U.S. Cl........ 260/239 BD; 71/92; 260/239.3 D; 260/244 A; 260/247.1 E; 260/247.5 H; 260/268 BC; 260/293.59; 260/558 D; 424/244; 424/248; 424/250; 424/267
[51] Int. Cl.$^2$.............. C07D 243/14; C07D 295/12
[58] Field of Search............... 260/239 BD, 268 BC

[56] References Cited
UNITED STATES PATENTS

| | | | |
|---|---|---|---|
| 3,131,178 | 4/1964 | Archer et al................. | 260/239 BD |
| 3,236,838 | 2/1966 | Archer et al................. | 260/239 BD |
| 3,414,563 | 12/1968 | Griot........................... | 260/239.3 D |
| 3,546,212 | 12/1970 | Felix et al.................... | 260/239.3 |
| 3,682,892 | 8/1972 | Ning et al.................... | 260/239 BD |

OTHER PUBLICATIONS
Hester et al., Tetrahedron Letters, No. 20, pp. 1609-1612, (1971), QD 241T42.

*Primary Examiner*—Alton D. Rollins
*Attorney, Agent, or Firm*—Hans L. Berneis

[57] ABSTRACT

2,3-Dihydro-1H-1,4-benzodiazepines of the formula II

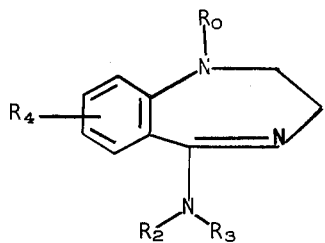

wherein $R_o$ is alkyl of 1 to 3 carbon atoms, inclusive; wherein $R_2$ is hydrogen or alkyl defined as above; wherein $R_3$ is alkyl, defined as above, hydroxy, alkoxy in which the alkyl moiety is defined as above, or

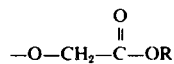

in which R is alkyl defined as above, or, together the group

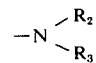

is 4-phenylpiperazino, and wherein $R_4$ is alkoxy, and alkylthio, in which the carbon moieties are of 1 to 3 carbon atoms, inclusive, nitro, trifluoromethyl, fluoro, chloro and bromo, are prepared by reacting a selected 5-alkoxy-2,3-dihydro-1H-1,4-benzodiazepine in which alkoxy has a carbon moiety of 1 to 3, with the desired amine

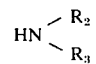

wherein $R_2$ and $R_3$ and

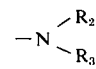

are defined as above.

The compounds of formula II above and the pharmacologically acceptable acid salts thereof have sedative and tranquilizing properties.

3 Claims, No Drawings

2,3-DEHYDRO-1H-1,4-BENZODIAZEPINES

CROSS REFERENCE TO RELATED APPLICATION

This application is a continuation-in-part of application Ser. No. 185,381, filed Sept. 30, 1971, and now abandoned.

BACKGROUND OF THE INVENTION

FIELD OF THE INVENTION

This invention is directed to new organic compounds and is particularly concerned with novel 2,3-dihydro-1H-1,4-benzodiazepines and a process for the production thereof.

The novel compounds and the process of production therefor can be illustratively represented as follows:

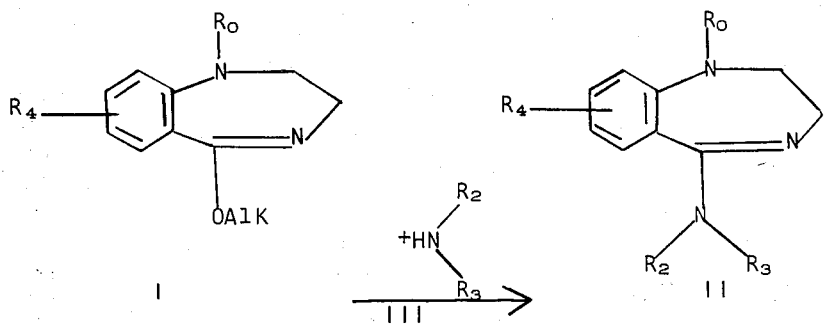

wherein $R_0$ is alkyl of 1 to 3 carbon atoms, inclusive; wherein $R_2$ is of hydrogen or alkyl defined as above; wherein $R_3$ is alkyl, defined as above, hydroxy, alkoxy in which the alkyl moiety is defined as above, or

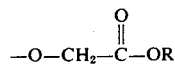

in which R is alkyl, defined as above, or together the group

is 4-phenylpiperazino; wherein $R_4$ is of hydrogen, alkyl defined as above, alkoxy and alkylthio in which the carbon moieties are of 1 to 3 carbon atoms, inclusive, nitro, trifluoromethyl, fluoro, chloro, and bromo, and wherein Alk is alkyl as defined above.

The preferred compounds of this invention have the formula IIA

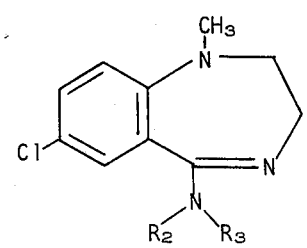

wherein $R_2$ is hydrogen or alkyl of 1 to 3 carbon atoms inclusive; $R_3$ is hydroxy or alkoxy of 1 to 3 carbon atoms inclusive, or together

is 4-phenylpiperazino.

The process of this invention comprises: treating a 5-alkoxybenzodiazepine 1 or an acid addition salt thereof with an amine

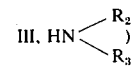

or an acid addition salt thereof in which $R_2$ and $R_3$ or the group

are defined as above, at a temperature of 60°–150° C. to give the 5-(N-substituted)benzodiazepines (II).

In order to obtain an acid salt, the free 5-(N-substituted) base II is treated with a pharmacologically acceptable acid.

DESCRIPTION OF THE PREFERRED EMBODIMENT

Alkyl groups of 1 to 3 carbon atoms, inclusive, are exemplified by methyl, ethyl and propyl.

The carbon chain moiety of alkoxy and alkylthio, which is of 1 to 3 carbon atoms, inclusive, can be defined as lower-alkyl of 1 to 3 carbon atoms, inclusive, above.

The novel compounds of the formula II and pharmacologically acceptable acid addition salts thereof have sedative, hypnotic, anticonvulsant, tranquilizing, and muscle relaxant effects in mammals and birds. Also as feed additives they are useful for increasing the growth rate and feed efficiency of livestock and poultry.

The pharmacologically acceptable acid addition salts of compounds of formula II contemplated in this invention, are the hydrochlorides, hydrobromides, hydriodides, sulfates, phosphates, cyclohexanesulfamates, methanesulfonates and the like, prepared by reacting a compound of formula II with the selected pharmacologically acceptable acid.

Sedative effects of 7-chloro-2,3-dihydro-5-(methoxyamino)-1-methyl-1H-1,4-benzodiazepine are shown by the following tests in mice:

Chimney test: [Med. Exp. 4, 145 (1961)]: The effective intraperitoneal dosage for 50% of mice ($ED_{50}$) is 89 mg./kg. The test determines the ability of mice to back up and out of a vertical glass cylinder within 30 seconds. At the effective dosage, 50% of the mice failed doing it.

Dish test: Mice in Petri dishes (1-cm. diameter, 5 cm, high, partially embedded in wood shavings), climb out in a very short time, when not treated. Mice remaining in the dish for more than 3 minutes indicates tranquilization. $ED_{50}$ equals the dosage of the test compound at which 50% of the mice remain in the dish. The $ED_{50}$ (intraperitoneal administration) in this test was 15 mg./kg.;

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 16 mg./kg.

Nicotine antagonism test:

Mice in a group of 6 are injected with the test compound (7-chloro-2,3-dihydro-5-(methoxyamino)-1-methyl-1H-1,4-benzodiazepine). Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 20 mg./kg. of the test compound protected 50% of the mice against (2) and against (3) ($ED_{50}$).

The following compounds have (by intraperitoneal injection) $ED_{50}$ as shown in the table below.

|  | $ED_{50}$ (in mg./kg.) | | | |
| --- | --- | --- | --- | --- |
|  | Ch | D | P | Ni |
| 7-chloro-2,3-dihydro-5-(hydroxyamino)-1-methyl-1H-1,4-benzodiazepine | 36 | 6.3 | 1.4 | 11 |
| 7-chloro-2,3-dihydro-1-methyl-5-(4-phenylpiperazino)-1H-1,4-benzodiazepine | 29 | 23 | 23 | 18 |
| 7-chloro-2,3-dihydro-5-[2-(hydroxyethyl)amino]-1-methyl-1H-1,4-benzodiazepine | 5.0 | 4 | 6.25 | 6.25 |

Ch = chimney test
D = dish test
P = pedestal test
Ni = nicotine antagonism (3) test The pharmaceutical forms contemplated by this invention include pharmaceutical compositions suited for oral, parenteral, and rectal use, e.g. tablets, powder packets, cachets, dragees, capsules, solutions, suspensions, sterile injectable forms, suppositories, bougies, and the like, Suitable diluents or carriers such as carbohydrates (lactose), proteins, lipids, calcium phosphate, cornstarch, stearic acid, methylcellulose and the like may be used as carriers or for coating purpose. Water and oil, e.g., coconut oil, sesame oil, safflower oil, cottonseed oil, peanut oil, may be used for preparing solutions or suspensions of the active drug. Sweetening, coloring, and flavoring agents may be added.

For mammals and birds food premixes, with starch, oatmeal, dried fishmeat, fishmeal, flour, and the like, can be prepared. A feed containing from 100 g. to 1000 g. per ton of feed of compound II or salts thereof is useful to produce faster growth, or higher milk or egg production in farm animals.

As tranquilizers the compounds of formula II and their pharmacologically acceptable acid addition salts thereof can be used in dosages of 1 to 50 mg./kg., with 2 to 20 mg./kg. preferred, in oral or injectable preparations as described above, to alleviate tension and anxiety in mammals, or birds, such as e.g., occurs when animals are in travel.

Other acid additions salts of the compounds of formula II can be made such as the fluosilicic acid addition salts which are useful mothproofing compounds or the trichloroacetates useful as herbicides against Johnson grass, Bermuda grass, yellow foxtail and green foxtail, and quack grass.

The starting materials of formula I of this invention, substituted or unsubstituted 2,3-dihydro-5-alkoxy-1H-1,4-benzodiazepines are prepared as shown in Preparations 1–6.

In carrying out the process of this invention a 5-alkyloxy-2,3-dihydro-1H-1,4-benzodiazepine I is reacted with an amine of the formula III:

in which $R_2$ and $R_3$ have the significance as above. If the amine is a liquid, no additional solvent is necessary; the amine then is preferably used in excess. If the amine is a solid, a solvent such as ethanol, 1-propanol, 2-propanol, 1- and 2-butanol, benzene, toluene, xylenes, or the like are used. In the preferred embodiment of this invention the reaction is carried out at the reflux temperature of the mixture, between about 60°–150° C. for a period of 1–48 hours. The reaction is catalyzed by the presence of a small amount of mineral acid e.g. hydrochloric, hydrobromic or sulfuric acid. The acid can be provided by using the amine III as its acid addition salt.

The product II is recovered by conventional means e.g. removal of the solvent by distillation, recovering the impure product and purifying it by extraction, chromatography, crystallization or other conventional procedures.

The following Preparations and Examples are illustrative of the process and products of the present invention, but are not to be construed as limiting.

PREPARATION 1

N-Methyl-5-chloroisatoic anhydride

To a solution of 19.76 g. (0.1 mole) of 5-chloroisatoic anhydride in 100 ml. of dimethylformamide was added, portionwise, with stirring 4.3 g. of a 58.6% sodium hydride dispersion in mineral oil (0.105 mole). The mixture was stirred for an hour and then 47.5 g. (0.34 mole) of methyl iodide in 100 ml. of dimethylformamide was added (exothermic). The mixture was refluxed for 5 hours. The dimethylformamide was removed under reduced pressure, water was added and the mixture extracted with chloroform, washed with water, dried and concentrated to a crystalline product. Trituration with ether gave 12.55 g. of N-Methyl-5-chloroisatoic anhydride of melting point 198°–199.5° C.

Anal. calcd. for $C_9H_6ClNO_3$:

C, 51.08; H, 2.86; Cl, 16.76; N, 6.61.
Found: C, 51.50; H, 2.93; Cl, 16.89; N, 6.22.

PREPARATION 2

2-Methylamino-5-chlorobenzamide

A solution of 12.55 g. of N-methyl-5-chloroisatoic anhydride in 250 ml. of liquid ammonia was allowed to stand at ambient temperatures over night during which time the ammonia evaporated. The residue was recrystallized from 1600 ml. of hot water; yield, 8.45 g. of 2-methylamino-5-chlorobenzamide of melting point 148°–149° C.

Anal. calcd. for $C_8H_9ClN_2O$:
C, 52.04; H, 4.91; Cl, 19.20; N, 15.18.
Found: C, 51.53; H, 5.03; Cl, 19.23; N, 14.58.

PREPARATION 3

2-[N-Methyl-N-(2-hydroxyethyl)]amino-5-chlorobenzamide

To 150 ml. of ethylene oxide in 1100 ml. of glacial acetic acid in an ice bath was added 70.0 g. of 2-methyl-amino-5-chlorobenzamide. The mixture was stirred at 0°–5° C. for 2 hours and then at room temperature for 48 hours. The solution was concentrated to one half volume under reduced pressure and adjusted to pH 8.0 with 10% aqueous sodium hydroxide with cooling. The solution was extracted with ether, dried and concentrated to give 60.2 g. of oily product. The aqueous solution was then extracted with chloroform and concentrated to give 32.4 g., which crystallized and was recrystallized from benzene to yield 6.0 g. of 2-[N-methyl-N-(2-hydroxyethyl)]amino-5-chlorobenzamide of melting point 78°–79° C.

Anal. calcd. for $C_{10}H_{13}ClN_2O_2$:
C, 52.52; H, 5.73; Cl, 15.51; N, 12.25.
Found: C, 52.61; H, 5.83; Cl, 15.58; N, 12.15.

For the next step, preparation of the 2-[N-methyl-N-(2-chloroethyl)]amino-5-chlorobenzamide, the oily product was used without further purification.

PREPARATION 4

2-[N-Methyl-N-(2-chloroethyl)]amino-5-chlorobenzamide

To 850 ml. of thionyl chloride at 0° C. was added 82.0 g. of 2-[N-methyl-N-(2-hydroxyethyl)]amino-5-chlorobenzamide and the solution stirred at 0° C. for 6 hours and at room temperature overnight. The thionyl chloride was removed under reduced pressure and the syrup washed with 400 ml. of petroleum ether. The residue was dissolved in 300 ml. of water and the pH slowly adjusted to 7 with 10% aqueous sodium hydroxide keeping the solution cool. The solution was extracted with chloroform, dried and concentrated to yield 68 g. of crude material. Crystallization from ethyl acetate-Skellysolve B hexanes gave 29.55 g. of 2-[N-methyl-N-(2-chloroethyl)]amino-5-chlorobenzamide of melting point 111°–112.5° C.

Anal. calcd. for $C_{10}H_{12}Cl_2N_2O$:
C, 48.60; H, 4.90; Cl, 28.69; N, 11.34.
Found: C, 48.93; H, 4.08; Cl, 27.79; N, 11.27.

A second crop of 12.5 g., melting point 105°–107.5°, which is pure by thin layer chromatograph (silica gel, ethyl acetate), was obtained upon concentration of the mother liquors.

PREPARATION 5

7-chloro-1,2,3,4-tetrahydro-1-methyl-5H-1,4-benzodiazepin-5-one

To a suspension of 585 mg. of a 58.6% sodium hydride dispersion in mineral oil (14.2 millimoles) in 15 ml. of anhydrous benzene was added, dropwise, with stirring, 2.47 g. (10 millimoles) of 2-[N-methyl-N-(2-chloroethyl)]amino-5-chlorobenzamide in 5 ml. of anhydrous benzene. The mixture was then heated at reflux for 3 hours, cooled to room temperature and 10 ml. of benzene saturated with water carefully added. The benzene solution was then washed with water, and concentrated. The resulting solid was crystallized from benzene to yield 790 mg. of 7-chloro-1,2,3,4-tetrahydro-1-methyl-5H-1,4-benzodiazepin-5-one of melting point 183°–185° C.

Anal. calcd. for $C_{10}H_{11}ClN_2O$:
C, 57.01; H, 5.26; Cl, 16.83; N, 13.30.
Found: C, 57.58; H, 5.34; Cl, 16.66; N, 12.97.

PREPARATION 6

7-Chloro-5-ethoxy-2,3-dihydro-1-methyl-1H-1,4-benzodiazepine

Epichlorohydrin (128 g.) was added, under nitrogen, to a stirred solution of freshly distilled boron trifluoride etherate (300ml.) in ether (725 ml.) at such a rate that the reaction mixture refluxed gently. After the addition, the mixture was refluxed for an additional 1.5 hours and allowed to stand at ambient temperature for 18 hours. The solvent was then removed via a filter stick and the solid was washed several times with dry ether. Residual ether was removed in vacuo; the resulting solid was dissolved in dry methylene chloride (700 ml.) and added to an ice cold suspension of 7-chloro-1,2,3,4-tetrahydro-1-methyl-5H-1,4-benzodiazepin-5-one (145 g.; 0.691 mole) in methylene chloride (2.8 l.). This mixture was allowed to stand at ambient temperature for 18 hours. It was then treated with 273 g. of 50% aqueous potassium carbonate. The yellow solution was filtered through a small pad of potassium carbonate and concentrated in vacuo. A suspension of the residue in water and ether was made alkaline with potassium carbonate. The layers were separated and the aqueous layer was extracted with ether. The combined ether solution was washed with brine, dried over anhydrous potassium carbonate and concentrated. A solution of the residue in petroleum ether was filtered through a small pad of silica gel and crystallized at 0° C. to give 102.8 g. (62.2%) of 7-chloro-5-ethoxy-2,3-dihydro-1-methyl-1H-1,4-benzodiazepine of melting point 36.5°–38.5° C. The analytical sample, melting point 38.5°– 39° C., was prepared by recrystallizing some of this material from petroleum ether at 0° C.

Anal. calcd. for $C_{12}H_{15}ClN_2O$:
C, 60.37; H, 6.33; Cl, 14.85; N, 11.74.
Found: C, 60.53; H, 6.46; Cl, 15.08; N, 11.65.

The hydrochloride salt was prepared by acidifying an ethereal solution of the base with ethereal hydrogen chloride. The analytical sample of melting point 116.5° C. was prepared by recrystallizing the salt from methylene chloride-ethyl acetate.

Anal. calcd. for $C_{12}H_{16}Cl_2N_2O$:
C, 52.37; H, 5.86; Cl, 25.77; N, 10.18. Found: C, 52.24; H, 5.89; Cl, 26.15; N, 9.81.

In the same manner illustrated by Preparations 1 through 6 other 5-alkoxy-2,3-dihydro-1H-1,4-benzodiazepines (1) and acid addition salts thereof can be made. Representative starting materials thus produced include:

7-nitro-5-methoxy-2,3-dihydro-1,3-diethyl-1H-1,4-benzodiazepine;
8-fluoro-2,3-dihydro-5-ethoxy-1-isopropyl-1H-1,4-benzodiazepine;
6-bromo-2,3-dihydro-1-methyl-5-propoxy-1H-1,4-benzodiazepine;
7-ethoxy-2,3-dihydro-1,3-dipropyl-5-propoxy-1H-1,4-benzodiazepine;
7-trifluoromethyl-2,3-dihydro-1-methyl-5-ethoxy-1H-1,4-benzodiazepine;
9-methoxy-2,3-dihydro-1-isopropyl-5-methoxy-1H-1,4-benzodiazepine;
8-propylthio-2,3-dihydro-1-ethyl-3-isopropyl-5-methoxy-1H-1,4-benzodiazepine;
9-bromo-2,3-dihydro-1-isopropyl-5-ethoxy-1H-1,4-benzodiazepine;
8-nitro-2,3-dihydro-1-ethyl-5-ethoxy-1H-1,4-benzodiazepine;
9-isopropyl-2,3-dihydro-1-methyl-5-ethoxy-1H-1,4-benzodiazepine;
8-chloro-2,3-dihydro-1-propyl-5-ethoxy-1H-1,4-benzodiazepine;
and the like.

EXAMPLE 1

7-chloro-2,3-dihydro-5-(hydroxyamino)-1-methyl-1H-1,4-benzodiazepine

A mixture of 7-chloro-5-ethoxy-2,3-dihydro-1-methyl-1H-1,4-benzodiazepine (2.39 g.; 0.010 mole), hydroxylamine hydrochloride (0.904 g.; 0.013 mole), sodium bicarbonate (1.09 g.; 0.013 mole) and absolute ethanol (50 ml.) was refluxed, under nitrogen, for 1.5 hours, cooled and filtered. The filtrate was concentrated in vacuo, and the residue was recrystallized from methylene chloride-ethyl acetate to give 1.74 g. (77%) of 7-chloro-2,3-dihydro-5-(hydroxyamino)-1-methyl-1H-1,4-benzodiazepine of melting point 184°–188.5° C. The analytical sample had a melting point of 186.5°–189° C.

Anal. calcd. for $C_{10}H_{12}ClN_3O$:
C, 53.22; H, 5.36; Cl, 15.71; N, 18.62.
Found: C, 53.20; H, 5.09; Cl, 15.88; N, 18.47.

EXAMPLE 2

7-Chloro-2,3-dihydro-5-(methoxyamino)-1-methyl-1H-1,4-benzodiazepine

A mixture of 7-chloro-5-ethoxy-2,3-dihydro-1-methyl-1H-1,4-benzodiazepine (2.98 g. 0.0125 mole), methoxylamine hydrochloride (2.07 g., 0.0250 mole), NaHCO$_3$ (2.07 g.) and absolute ethanol (125 ml.) was refluxed under nitrogen for 6 hours and concentrated in vacuo. A suspension of the residue in water was extracted with methylene chloride. The extract was dried over anhydrous potassium carbonate and concentrated. Chromatography of the residue on silica gel (250 g.) with 20% ethyl acetate-80% cylcohexane gave the pure product which was crystallized from Skellysolve B hexanes to give 0.66 g. (22%) of 7-chloro-2,3-dihydro-5-(methoxyamino)-1-methyl-1H-1,4-benzodiazepine of melting point 104°–105° C. The analytical sample had a melting point of 118°–119° C.

Anal. calcd. for $C_{11}H_{14}ClN_3O$:
C, 55.11; H, 5.89; Cl, 14.79; N, 17.53.
Found: C, 55.17; H, 6.00; Cl, 14.92; N, 17.48.

EXAMPLE 3

7-Chloro-2,3-dihydro-5-[2-(hydroxyethyl)amino]-1-methyl-1H-1,4-benzodiazepine

A solution of 7-chloro-5-ethoxy-2,3-dihydro-1-methyl-1H-1,4-benzodiazepine hydrochloride (2.75 g.; 0.01 mole) and 2-aminoethanol (7.32 g.; 0.12 mole) in benzene was refluxed for 22 hours, under nitrogen. The ethanol-benzene azeotrope was distilled from the reaction mixture during the first 4 hours of the reaction. The cooled reaction mixture was poured into water, made alkaline with sodium hydroxide and extracted with ether. The ether extract was washed with water and brine, dried over anhydrous potassium carbonate and concentrated in vacuo. Crystallization of the residue from ethyl acetate-Skellysolve B hexanes gave 1.53 g. (60.3%) of 7-chloro-2,3-dihydro-5-[2-hydroxyethyl)amino]-1-methyl-1H-1,4-benzodiazepine of melting point 113°–115° C. The analytical sample (crystallized from ethyl acetate) had a melting point of 115°–116.5° C.

Anal. calcd. for $C_{12}H_{16}ClN_3O$:
C, 56.80; H, 6.36; Cl, 13.98; N, 16.56.
Found: C, 56.63; H, 6.49; Cl, 14.32; N, 16.55.

EXAMPLE 4

7-Chloro-5-[2-(diethylamino)ethylamino]-2,3-dihydro-1-methyl-1H-1,4-benzodiazepine dihydrochloride A solution of 7-chloro-5-ethoxy-2,3-dihydro-1-methyl-1H-1,4-benzodiazepine hydrochloride (2.3 g.; 0.00838 mole) and N,N-diethylethylenediamine (7 g.) in benzene (100 ml.) was refluxed under nitrogen for 18 hours. During the first few hours of the reaction, the ethanol azeotrope was distilled from the reaction mixture through a glass helix-packed column. The reaction mixture was poured into water, made alkaline with sodium hydroxide and extracted with ether. The ether extract was washed with water and brine, dried over anhydrous potassium carbonate and concentrated in vacuo. The residue was chromatographed on silica gel (150 g.) with a solution composed of 2% triethylamine, 5 to 10% methanol, and 93 to 88% ethyl acetate. The product thus obtained was converted to its hydrochloride salt with methanolic hydrogen chloride and crystallized from methanol-ethyl acetate to give 2.29 g. (71.71%) of 7-chloro-5-[2-(diethylamino)ethylamino]-2,3-dihydro-1-methyl-1H-1,4-benzodiazepine dihydrochloride of melting point 249°–253.5° C. (dec.). The analytical sample which had a melting point of 253°–255° C. was prepared by recrystallizing some of this material from methanol-ethyl acetate.

Anal. calcd. for $C_{16}H_{27}Cl_3N_4$:
C, 50.33; H, 7.13; Cl, 27.86; N, 14.68.
Found: C, 50.34; H, 7.20; Cl, 27.63; N, 14.54.

EXAMPLE 5

N-(7-chloro-2,3-dihydro-1-methyl-1H-1,4-benzodiazepin-5-yl)aminoxyacetic acid ethyl ester A mixture of 7-chloro-5-ethoxy-2,3-dihydro-1-methyl-1H-1,4-benzodiazepine (1.19 g.; 0.005 mole), ethyl aminoxyacetate hydrochloride (2.35 g.; 0.01 mole) sodium bicarbonate (0.84 g.; 0.01 mole) and absolute ethanol (30 ml.) was refluxed under nitrogen, for 6 hours, cooled and filtered. The filtrate was concentrated in vacuo. The residue was chromatographed on silica gel (200 g.) with 30% ethyl acetate-70% Skellysolve B hexanes. The product thus obtained was crystallized from ethyl acetate-Skellysolve B hexanes to give 0.44 g. (28.2%) of N-(7-chloro-2,3-dihydro-1-methyl-1H-1,4-benzodiazepin-5-yl)aminoxyacetic acid ethyl ester of melting point 124°–127.5° C. The analytical sample had a melting point of 130°–130.5° C.

Anal. calcd. for $C_{14}H_{18}ClN_3O_3$:
C, 53.93; H, 5.82; Cl, 11.37; N, 13.48.
Found: C, 53.93; H, 5.68; Cl, 11.46; N, 13.66.

EXAMPLE 6

7-Chloro-2,3-dihydro-1-methyl-5-(4-phenylpiperazino)-1H-1,4-benzodiazepine

A mixture of 7-chloro-5-ethoxy-2,3-dihydro-1-methyl-1H-1,4-benzodiazepine hydrochloride (2.75 g., 0.01 mole) and N-phenylpiperazine (4.85 g.) was heated, under nitrogen, at about 150° for 18 hours, cooled and poured into water. This mixture was made alkaline with sodium hydroxide and extracted with methylene chloride. The extract was dried over anhydrous potassium carbonate and concentrated in vacuo. The residue was chromatographed on silica gel (400 g.) with 2% triethylamine-5% methanol-93% ethylacetate. The product thus obtained was crystallized from ether-petroleum ether to give 0.84 g. (23.6%) of 7-chloro-2,3-dihydro-1-methyl-5-(4-phenylpiperazino)-1H-1,4-benzodiazepine of melting point 128°–130° C. The analytical sample had a melting point of 130°–131° C.

Anal. calcd. for $C_{20}H_{23}ClN_4$:
C, 67.69; H, 6.53; Cl, 9.99; N, 15.79.
Found: C, 67.44; H, 6.29; Cl, 9.99; N, 15.80.

EXAMPLE 7

7-Nitro-2,3-dihydro-5-(ethoxyamino)-1,3-diethyl-1H-1,4-benzodiazepine

In the manner given in Example 2, 7-nitro-5-methoxy-2,3-dihydro-1,3-diethyl-1H-1,4-benzodiazepine was refluxed with ethoxyamine hydrochloride and sodium bicarbonate in ethanol to give 7-nitro-2,3-dihydro-5-(ethoxyamino)-1,3-diethyl-1H-1,4-benzodiazepine.

EXAMPLE 8

8-Fluoro-2,3-dihydro-5-[3-(hydroxypropyl)amino]-1-isopropyl-1H-1,4-benzodiazepine In the manner given in Example 3, 8-fluoro-2,3-dihydro-5-ethoxy-1-isopropyl-1H-1,4-benzodiazepine hydrochloride was refluxed with 3-aminopropanol in benzene to give 8-fluoro-2,3-dihydro-5-[3-(hydroxypropyl)amino]-1-isopropyl-1H-1,4-benzodiazepine.

EXAMPLE 9

6-Bromo-2,3-dihydro-5-[3-(dipropylaminopropyl)amino]-1-methyl-1H-1,4-benzodiazepine In the manner given in Example 4, 6-bromo-2,3-dihydro-5-propoxy-1-methyl-1H-1,4-benzodiazepine was refluxed with N,N-dipropylpropylenediamine in benzene to give 6-bromo-2,3-dihydro-5-[3-(dipropylaminopropyl)amino]-1-methyl-1H-1,4-benzodiazepine.

EXAMPLE 10

N-(7-trifluoromethyl-2,3-dihydro-1-methyl-1H-1,4-benzodiazepin-5-yl)aminoxypropionic acid propyl ester In the manner given in Example 5, 7-trifluoromethyl-2,3-dihydro-1-methyl-5-ethoxy-1H-1,4-benzodiazepine was refluxed with propyl aminoxypropionate hydrochloride in ethanol with sodium carbonate to give N-(7-trifluoromethyl-2,3-dihydro-1-methyl-1H-1,4-benzodiazepin-4-yl)aminoxypropionic acid propyl ester.

EXAMPLE 11

8-Propylthio-2,3-dihydro-5-hydroxyamino-1-ethyl-3-isopropyl-1H-1,4-benzodiazepine In the manner given in Example 1, 8-propylthio-2,3-dihydro-1-ethyl-3-isopropyl-5-methoxy-1H-1,4-benzodiazepine was refluxed with hydroxylamine hydrochloride, and sodium carbonate in methanol to give 8-propylthio-2,3-dihydro-5-hydroxyamino-1-ethyl-3-isopropyl-1H-1,4-benzodiazepine.

EXAMPLE 12

6-Fluoro-2,3-dihydro-1-methyl-5-(4-phenylpiperazino)-1H-1,4-benzodiazepine

In the manner given in Example 6, 6-fluoro-2,3-dihydro-1-methyl-5-propoxy-1H-1,4-benzodiazepine hydrochloride was refluxed with N-phenylpiperazine in toluene to give 6-fluoro-2,3-dihydro-1-methyl-5-(4-phenylpiperazino)-1H-1,4-benzodiazepine.

In the same manner given in the preceding examples other 5-substituted-2,3-dihydro-1H-1,4-benzodiazepines II can be prepared by reacting a compound of formula I or acid addition salt thereof with an amine II or an acid addition salt thereof. Representative compounds, thus prepared, include:

7-nitro-5-diethylamino-2,3-dihydro-1,3-diethyl-1H-1,4-benzodiazepine;
9-bromo-2,3-dihydro-1-ethyl-3-methyl-5-piperidino-1H-1,4-benzodiazepine;
8-nitro-1,3-dimethyl-2,3-dihydro-5-morpholino-1H-1,4-benzodiazepine;
9-chloro-1-methyl-5-[3-(diethylamino)propylamino]-2,3-dihydro-1H-1,4-benzodiazepine;
8-chloro-1-2,3-dihydro-5-piperidino-1H-1,4-benzodiazepine;
7-trifluoromethyl-1-methyl-2,3-dihydro-5-(isopropoxyamino)-1H-1,4-benzodiazepine;
8-fluoro-2,3-dihydro-1-isopropyl-5-[3-(hydroxypropyl)amino]-1H-1,4-benzodiazepine;
7-ethoxy-2,3-dihydro-1,3-dipropyl-5-(dipropylamino)-1H-1,4-benzodiazepine;
7-trifluoromethyl-2,3-dihydro-1-methyl-5-(morpholino)-1H-1,4-benzodiazepine; and the like.

Treating the compounds of formula II with a pharmacologically acceptable acid such as hydrochloric, hydrobromic, phosphoric, sulfuric, acetic, propionic, toluenesulfonic, methanesulfonic, tartaric, citric, lactic, malic, maleic, and cyclohexanesulfamic acids produces the pharmacologically acceptable salts of these compounds of formula II which can be used like the free base compounds of formula II. Salt formation is achieved in conventional manner by reacting the compounds of formula II with excess of a selected acid in a suitable medium e.g. water, a lower alkanol, ether, or acetone and recovering the salt by evaporating the solvent, preferably in vacuo.

I claim:

1. 7-Chloro-2,3-dihydro-5-(hydroxyamino)-1-methyl-1H-1,4-benzodiazepine.
2. N-(7-Chloro-2,3-dihydro-1-methyl-1H-1,4-benzodiazepine-5-yl)aminoxyacetic acid ethyl ester.
3. 7-Chloro-2,3-dihydro-1-methyl-5-(4-phenylpiperazino)-1H-1,4-benzodiazepine.

* * * * *